United States Patent [19]

Greene et al.

[11] Patent Number: 4,553,994
[45] Date of Patent: Nov. 19, 1985

[54] METHOD FOR FORMING GLASS FIBERS

[75] Inventors: Neil E. Greene, Granville; Terry J. Hanna, Newark, both of Ohio

[73] Assignee: Owens-Corning Fiberglas Corporation, Toledo, Ohio

[21] Appl. No.: 597,578

[22] Filed: Apr. 9, 1984

[51] Int. Cl.$^4$ ............................................ C03B 37/085
[52] U.S. Cl. ........................................ 65/2; 65/1; 65/12; 65/346
[58] Field of Search ........................... 65/1, 2, 12, 346

[56] References Cited

U.S. PATENT DOCUMENTS

| | | |
|---|---|---|
| Re. 21,863 | 7/1941 | Slayter . |
| 2,189,822 | 2/1940 | Thomas et al. . |
| 2,212,528 | 8/1940 | Slayter . |
| 2,257,767 | 10/1941 | Slayter et al. . |
| 2,577,213 | 12/1951 | Slayter et al. ........................ 259/17 |
| 2,947,027 | 8/1960 | Slayter . |
| 3,187,076 | 6/1965 | Machlan et al. . |
| 3,328,144 | 6/1967 | Glaser ..................................... 65/11 |
| 3,390,972 | 7/1968 | Froberg ................................. 65/11 |
| 3,401,536 | 9/1968 | Glaser ..................................... 65/1 |
| 3,416,906 | 12/1968 | Glaser ..................................... 65/1 |
| 3,492,104 | 1/1970 | Glaser ..................................... 65/11 |
| 3,556,753 | 1/1971 | Glaser ..................................... 65/2 |
| 3,837,823 | 9/1974 | Shealy .................................... 65/1 |
| 3,840,358 | 10/1974 | Whitfield, Jr. ........................ 65/1 |
| 3,920,429 | 11/1975 | Stalego .................................. 65/1 |
| 3,926,600 | 12/1975 | Stalego .................................. 65/1 |
| 3,988,135 | 10/1976 | Goggin .................................. 65/1 |
| 4,026,689 | 5/1977 | Higginbotham ...................... 65/1 |
| 4,046,535 | 9/1977 | Stalego .................................. 65/1 |
| 4,161,396 | 7/1979 | Greene et al. ......................... 65/1 |
| 4,436,541 | 3/1984 | Pellegrin et al. ...................... 65/2 |

FOREIGN PATENT DOCUMENTS 420486 4/1947 Italy ........................................ 65/1

Primary Examiner—Robert Lindsay
Attorney, Agent, or Firm—Ronald C. Hudgens; Kenneth H. Wetmore; Hiram P. Settle

[57] ABSTRACT

The present invention proposes a novel apparatus and method for the manufacture of glass fibers utilizing a bushing confining a body of molten glass over an orifice plate which may or may not have depending tips. Interposed in the glass body is a plate or other device for reducing the pressure of the molten glass body over the orifice plate to a pressure no greater than atmospheric pressure. The orifices are of relatively large diameter incapable of imposing a substantial pressure drop on molten glass flowing therethrough. Each tip contains a pool of molten glass at no greater than atmospheric pressure and, during fiber attenuation, a forming cone is drawn from the pool in each tip. The cones are located in the tips, each cone is smaller than the surrounding tip and each cone is stabilized on the interior tip wall by an annular glass portion integral with the cone. The process is dripless, since upon fiber interruption at any given tip, the molten glass pool remains in the tip.

18 Claims, 16 Drawing Figures

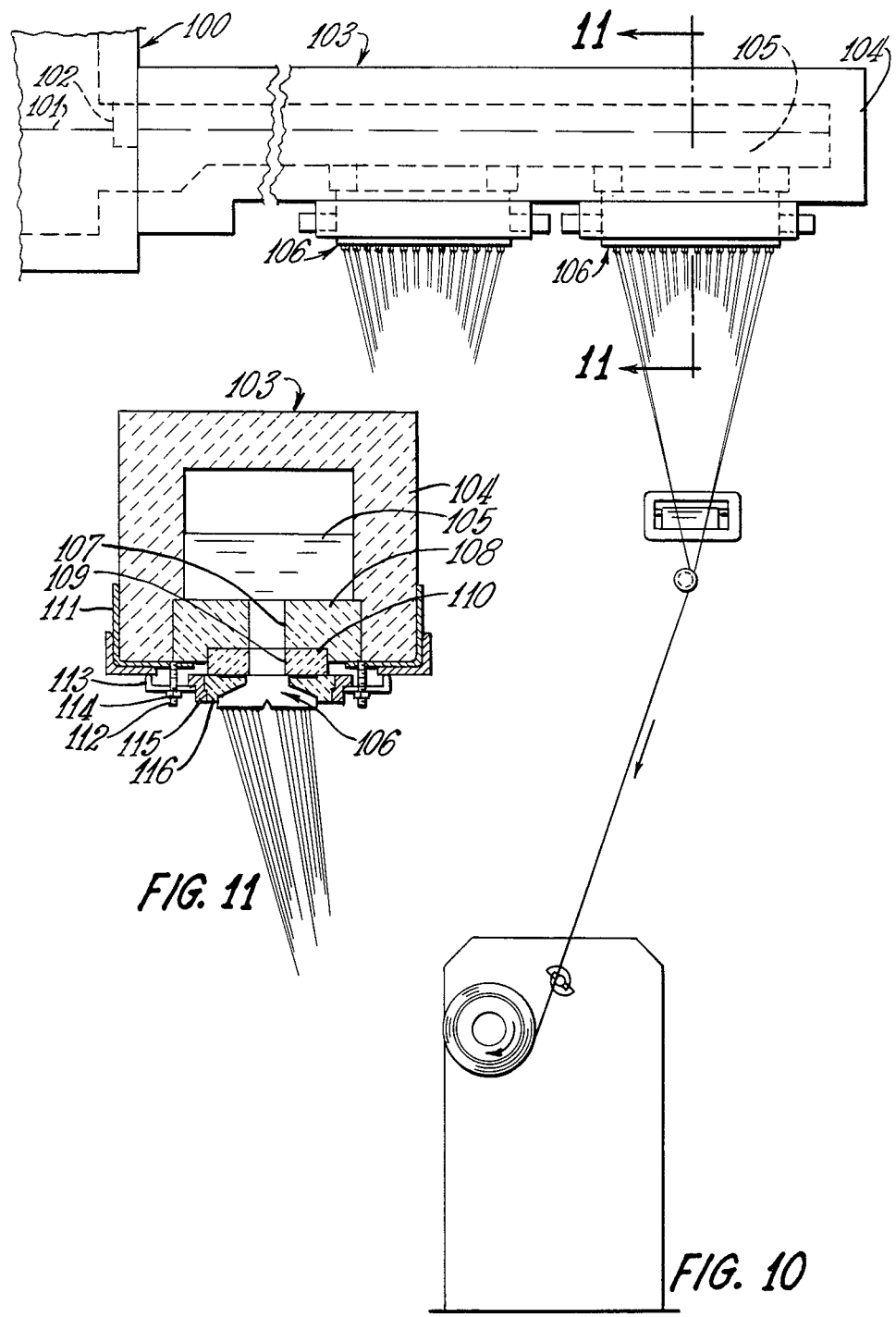

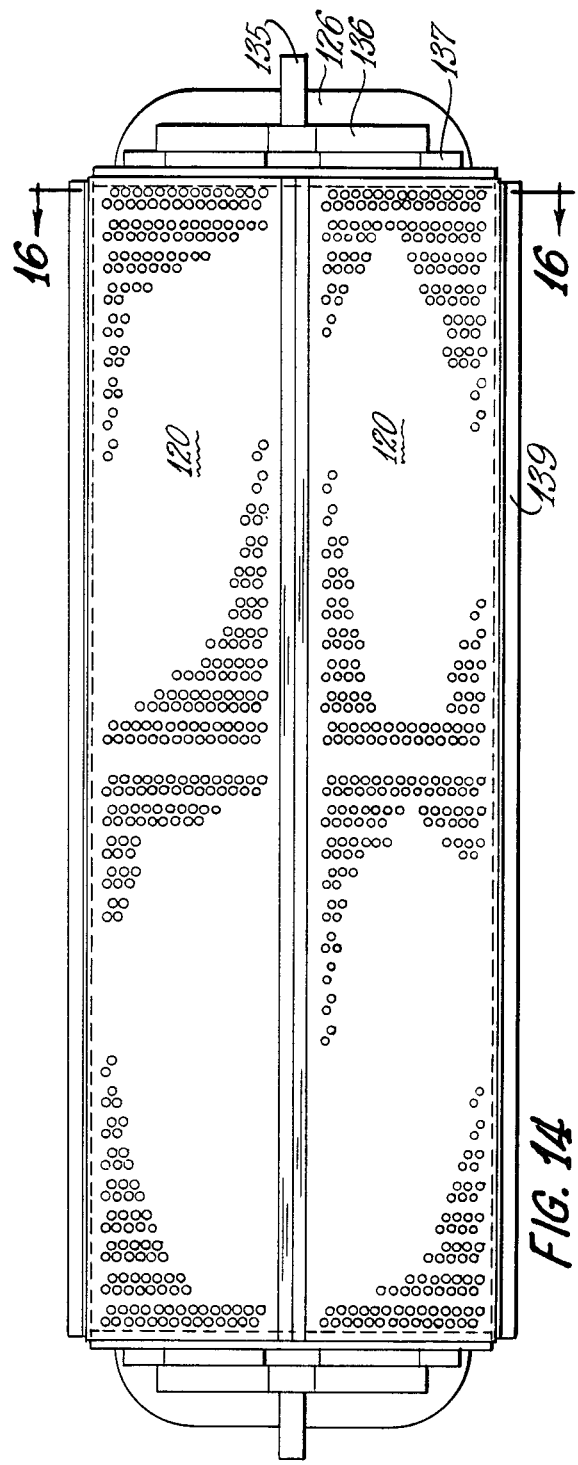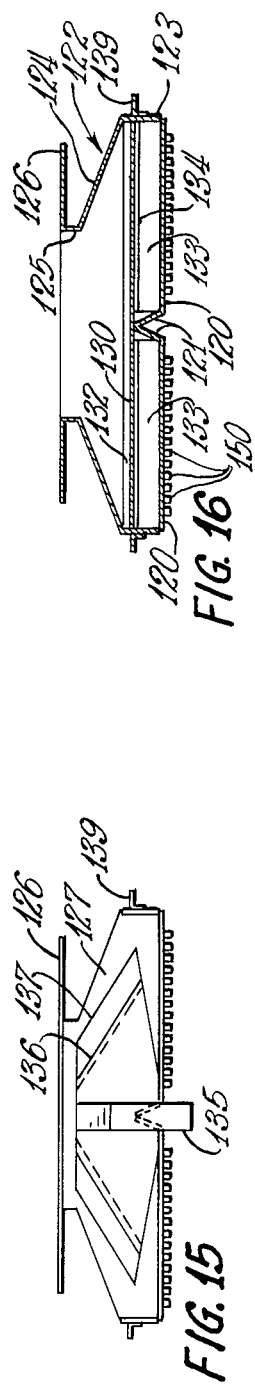

METHOD FOR FORMING GLASS FIBERS

TECHNICAL FIELD

This invention is an improvement in the production of filaments from molten material and particularly from molten glass; it minimizes process interruptions from flooding and bead drops.

BACKGROUND OF THE INVENTION

In producing continuous glass filaments, it is conventional to flow individual streams of molten glass from closely spaced orifices in the bottom wall of an electrically heated platinum or platinum alloy bushing. Apparatus associated with the bushing draws or attenuates the individual streams into filaments, which may be either continuous or discontinuous.

There are two types of continuous filament bushings in general use. A first, conventional, more widely-used type employs a bottom wall or orifice plate having stream-emitting orifices provided with tubular tips projecting from its undersurface, while a second, more recently developed type utilizes a plane bottom wall having a flat exterior surface. The first type is known as a "tipped" bushing, and examples are disclosed in Russell U.S. Pat. No. Re. 24,060 and in Glaser et al U.S. Pat. Nos. 4,222,757 and 4,321,074. The second type of bushing is known as a "tipless" bushing, and an example of such a bushing is disclosed in Strickland U.S. Pat. No. 3,905,790.

In both types of forming apparatus, the glass fiber is attenuated from a forming "cone" at the exit end of the forming orifice. The "cone" is of a smooth asymptotic shape from an upper base, which is essentially the diameter of the orifice, to the attenuated fiber. The head pressure of the molten glass in the bushing is reduced to the desired glass pressure in the cone by the pressure drop across the orifice, and in the case of a "tipped" bushing, by the pressure drop across the tip.

Upon interruption of the fiber attenuation process at any given orifice, molten glass flows from the orifice under the bushing head pressure to form a "bead" which drops into the "veil" of filaments attenuated from the other orifices. This bead interrupts filament production, requiring a fresh start-up of the complete bushing. The resultant intermittent operation substantially reduces the operating efficiency of the entire operation.

It would be desirable to prevent the formation and dropping of the beads upon fiber interruption and to avoid the necessity of manual start-up of the complete bushing upon bead formation and drop.

BRIEF DESCRIPTION OF THE PRESENT INVENTION

The present invention reduces the glass head pressure over the orifice of the fiber attenuation apparatus to an extent such that, upon fiberizing interruption for any reason at a given orifice, a bead will not drop into the veil of fibers being formed at the other orifices of the bushing. This pressure reduction is accomplished by interposing a pressure drop in the body of molten glass overlying the bushing forming orifices. This pressure drop is of a magnitude sufficient to reduce the pressure of glass over the orifice plate, e.g., at the entrance to the tips, to a value no greater than atmospheric pressure. The term "atmospheric pressure" as used herein means "ambient pressure," i.e., the pressure of the surrounding atmosphere which is exerted exteriorly of the forming orifice.

The present invention also proposes the utilization of an orifice which is appreciably larger than the orifice normally utilized in glass fiberizing bushings. Preferably, the orifices of the present invention are at least 0.070″ in diameter. Such an orifice normally imposes a pressure drop insufficient to form a fiber in a conventional fiberizing process. In the present invention, such a large orifice is operable because the pressure entering the orifice is no greater than atmospheric pressure, as above explained. Thus, there is no necessity of an appreciable pressure drop within the orifice or the tip, and orifices and tip diameters as large as 0.250 or 0.300″ in diameter may be utilized.

By utilizing such a large orifice and by reducing the pressure of molten glass in the orifice, the present invention apparently forms glass fibers from cones of unique configuration. The cones of the present invention are smaller than the orifice, the cones are formed in the orifices, and the cones are stabilized in the orifices by radial joining portions bridging the space between the relatively small cones and the larger, surrounding orifice. While the theory of formation of such unique cones is not fully understood at the present time, it is believed that each orifice contains a pool of molten glass at no greater than atmospheric pressure, and that each such pool is retained in its orifice by the greater atmospheric pressure at the orifice exit. The unique cone is, in effect, drawn from the pool of the molten glass, and the unique cone configuration results from the drawing of a fiber from a cone which is smaller than the pool in each orifice.

The molten glass in each orifice of the present invention does not bead down when fiber attenuation from the pool is interrupted, because the glass is retained in the tip by the greater atmospheric pressure exerted on the undersurface of the pool. This condition of drip-free operation will be maintained so long as the pressure drop interiorly of the molten glass body in the bushing is maintained.

BRIEF DESCRIPTION OF THE DRAWINGS

FIG. 10 is a side elevational view of a glass furnace provided with a forehearth and bushing of the present invention.

FIG. 11 is an enlarged sectional view taken along the plane 11—11 of FIG. 10.

FIG. 14 is a bottom view of the bushing of FIG. 12.

FIG. 15 is an end view of the bushing of FIG. 12.

FIG. 16 is a sectional view taken along the plane 16—16 of FIG. 14.

DETAILED DESCRIPTION OF THE INVENTION

Figure 1:
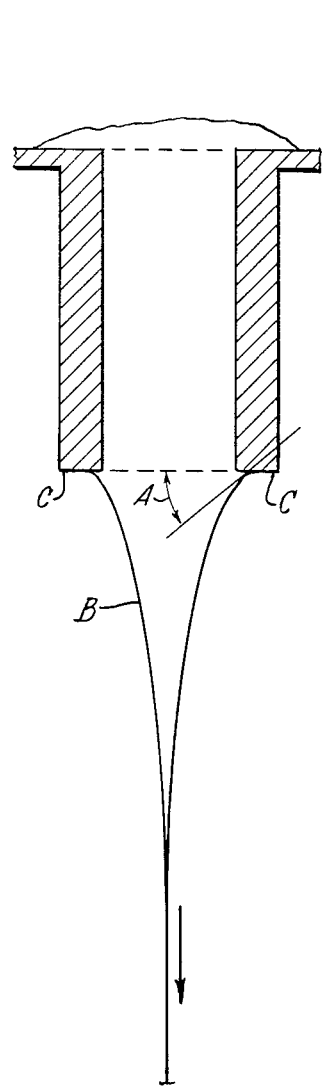
FIGS. 1 and 2 are schematic representations of prior art cone configurations.

In defining the present invention and in differentiating it from the previously commercially utilized processes, it is necessary to consider initially the conventional continuous glass fiber forming process.

The conventional process utilizes a body of molten glass which is located above a forming orifice. The orifice may be the outlet of a cylindrical depending tip or merely a non-tipped orifice in an orifice plate. Molten glass is supplied to the orifice from the molten body under a pressure which is atmospheric pressure plus the head pressure of the molten body, usually defined in terms of "inches of glass." A fiber is attenuated from the orifice —actually from a large number of orifices—by training the glass about the rotatable mandrel of a lower winder, while removing heat from the glass by fin shields, by air cooling, or by other means. As the glass is pulled by the winder, the tension in the strand attenuates the glass flowing through the orifice, and the glass rapidly reduces in size from the diameter of the orifice to the final filament diameter. The size of the orifice is from about 50 to about 500 times the size of the final filament. This great reduction in size takes place primarily in a "forming cone" located directly beneath the orifice and having an upper extremity or "base" which is the diameter of the orifice and a lower extremity which is the diameter of the filament. The generation and maintenance of a multiplicity of uniform, properly sized and shaped forming cones is the essence of the fiber forming process.

The molten glass exits from each of the orifices of a conventional bushing under a pressure which is essentially the head pressure of the molten glass body plus atmospheric pressure minus the pressure drop across the orifice tip. The internal cone pressure is negative—on the order of about one inch of glass—due to the cumulative effects of the tensioning of the fiber by the drawing apparatus and the pressure drop through the relatively restricted tip. The glass pulled through the orifice under these pressure conditions will "wet" the metal constituting the orifice tip or plate undersurface before being attenuated by the pulling tension. The conventional forming cone thus has its upper periphery located along the flat horizontal undersurface of the orifice tip or plate immediately adjacent the orifice, and the upper cone diameter is very slightly larger than the orifice diameter. For practical purposes, the cone diameter usually is described as being the same as the tip internal diameter.

It has been found that there is a definite, pre-determined contact angle of molten glass of given composition with a given metal surface at a given glass temperature. For example, the contact angle of "E" glass composition with "J" alloy metal at normal fiberizing temperature is about 40°. This angle remains substantially constant throughout the fiberizing process, so long as the glass temperature does not change. In the conventional fiberizing process, the forming cone contacts the horizontal undersurface of the orifice element at the necessary contact angle, i.e., on the order of 40°, and the cone converges downwardly in a smooth asymptotic shape as it is attenuated.

This condition for a conventional fiberizing cone is shown in FIG. 1 of the drawings, with the contact angle of 40° being indicated thereon at the angle A. The forming cone B of a conventional, prior art process, as illustrated in FIG. 1 of the drawings, thus has its base anchored at the orifice exit extremity C, so that the base diameter of the cone is determined by the orifice diameter. This is true whether the orifice exit extremity is the lower end of a hollow, conventional tip, or is the bottom surface of a tipless plate.

The conventional cone is asymptotic, converging in a single concave shape to the attenuated fiber. The length of the cone varies (a) with the viscosity of the glass in the cone, i.e., the cooler the glass, the shorter the cone; (b) with the winder speed, i.e., the faster the filament is attenuated, the shorter the cone; and (c) with the head pressure, the greater the head pressure on the glass at the orifice, the longer the cone. The tension in the filament varies (a) with glass viscosity, i.e., the cooler the glass, the higher the tension and (b) with the winder speed, i.e., the faster the filament is attenuated, the greater the tension. The throughput, i.e., the weight of glass issued from the orifice, is generally proportional to about the fourth power of the diameter of the orifice, with the larger the orifice, the greater the output. For a given size of orifice, the throughput will vary (a) with glass viscosity, i.e., the hotter the glass, the greater the output; (b) with the drawing or attenuation speed, i.e., the greater the drawing speed, the greater the throughput; and (c) with the pressure forcing the glass through the orifice, i.e., the greater the pressure, the greater the throughput.

Figure 2:
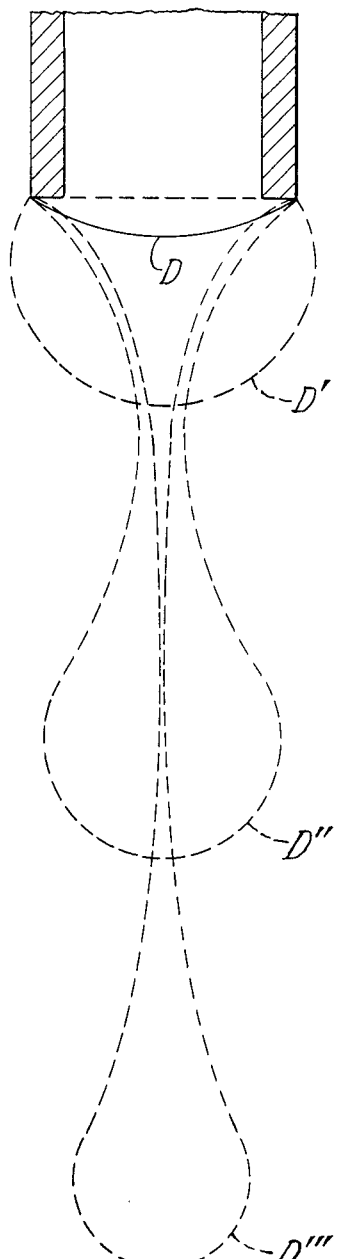

Upon interruption of the fiber formation at any given orifice in a conventional process, a fiber is no longer attenuated from that orifice. The pressure of the head of glass over the orifice forces glass through the orifice as a non-attenuated glass stream, and the fiberizing cone is no longer formed. As a result, the molten glass initially "beads," i.e., forms a globule D, beneath the orifice and then enlarges (as shown in globules D', D" and D''') to fall as a globule stringing out from the orifice, as shown in FIG. 2. This bead drops into the "veil" of fibers attenuated from the other orifices, breaking them and causing a complete interruption of production from the entire bushing. The bushing then must be completely restarted.

THE PROCESS OF THE PRESENT INVENTION

The present invention proposes a different type of cone formation, a different pressure relationship within the fiberizing orifice, and a different mode of operation, both during fiberization and upon fiberizing interruption at any given orifice.

Figure 3:
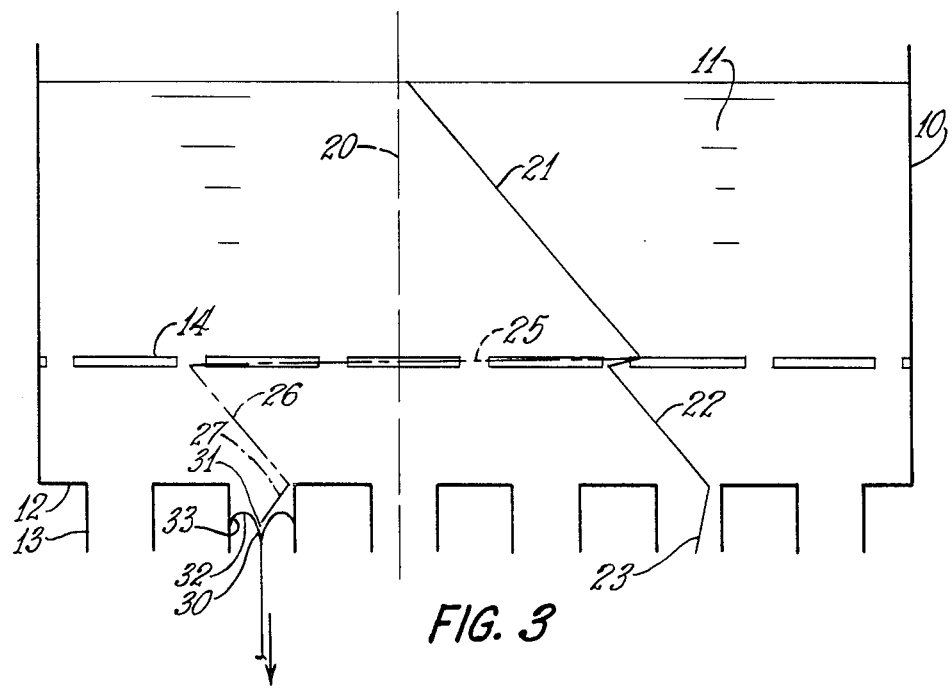
FIG. 3 is a schematic representation of a bushing of the present invention illustrating the pressure relationships therein.

First, a pressure-reducing means—preferably an apertured plate—is dispersed above the orifice plate to reduce the pressure of molten glass above the orifice plate to less than atmospheric pressure. Such a plate is illustrated in FIG. 3, wherein a bushing 10 contains a body of molten glass 11 over an orifice plate 12 having tubular tips 13. An apertured plate 14 is immersed in the glass body 11 to be parallel to and spaced above the orifice plate 12. The plate apertures are sized and numbered so that—when the bushing is running in a fiberizing mode—the net glass head pressure above the orifice plate and at the entrance to the tip apertures is less than atmospheric pressure.

Second, the orifice size or the internal diameter of the tips is larger than the conventional tip diameter—at least 0.070" in diameter. This substantially reduces the pressure drop through the tips, as compared to the pressure drop through the conventional tips which typically are 0.050" or less in diameter for the manufacture of fibers of the same nominal size.

At fiberizing conditions and when operating in a fiberizing mode, the pressure drop through a conventional tip is generally equal to the total head pressure of the molten glass immediately above the orifice plate—typically 8" to 12" of glass—less the reduced pressure generated internally of the cone because of the attenuation tension—typically about 1" to 2" of glass. As a result, the conventional tip imposes a pressure drop sufficient to generate a slightly negative pressure—i.e., less than atmospheric pressure—at the tip exit.

At fiberizing conditions and when operating in a fiberizing mode, the pressure drop through a tip of the present invention is very slight when compared to the pressure drop through a conventional tip. This is accomplished by enlarging the tip internal diameter, and is effective because the pressure of molten glass at the tip entrance is negative—i.e., less than the atmospheric pressure. At the point of cone formation, both the cone formed at the exterior lower surface of the conventional tip and the cone formed in the tip of the present invention have negative internal pressures of about the same order of magnitude, with the internal pressure of the cone of the present invention being about 10% to about 20% less than in the conventional tip.

Figure 4:
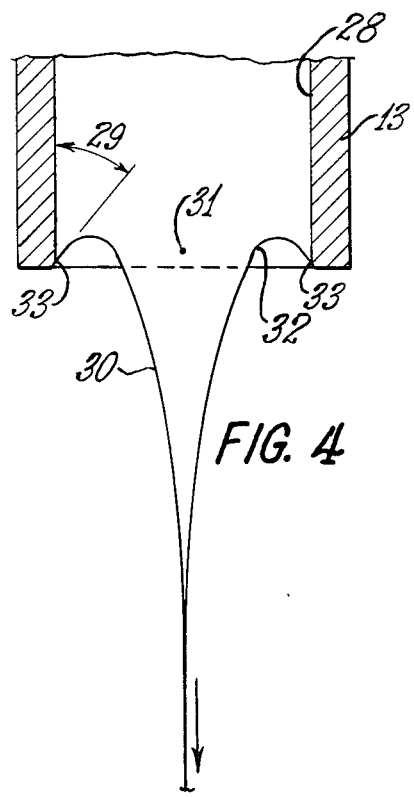
FIG. 4 is an enlarged schematic representation of an orifice of the present invention and a cone formed at the orifice.

Third, the fiberizing cones of the present invention are formed internally of the tips or orifices, rather than at the lower horizontal surfaces of the tips or orifices as in the conventional process. The fiberizing cones of the present process uniformly are smaller than the orifice diameter and are anchored or fixed to the internal surfaces of the orifices or tips by radial joining portions or webs which may be of varying configuration, as will be later explained in detail. In FIGS. 3 and 4, the fiberizing cones 30 are fixed to the internal surfaces of the tips by joining portions 32. As above explained, the contact angle of the glass-metal contact for "E" glass and "J" alloy at the normal fiberizing temperature is about 40°. In FIG. 4, the contact angle of 40° is indicated at 29, and the joining portion 32 is upwardly concavo-convex in order to join the cone 30 to the internal wall 28 of the tip 13 while maintaining the requisite contact angle.

Finally, the molten glass in any one of the tips 13 remains therein when fiberization is interrupted at that one tip. The molten glass in the tip does not bead and fall—as in the conventional process—because the molten glass within the tip is at a pressure which is no greater than atmospheric pressure. Each tip of a bushing of the present invention is filled with a pool of molten glass at atmospheric pressure or less.

To best explain the pressure relationships within the body of molten glass with the resistance plate therein, within the tips and within the cones, reference is made to FIG. 3 of the drawings.

In FIG. 3, the vertical line 20 represents atmospheric pressure, with positive pressure to the right of line 20 and negative pressure to the left of line 20. The line 21 represents the head pressure of the molten glass body 11 above the pressure plate 14, and the line 22 represents the head pressure above the orifice plate 12 when the bushing is not in a fiberizing mode, as during start-up. The line 22 is displaced slightly to the left of the line 21 because of a minimal pressure drop across the pressure plate. As a result of these pressure conditions, the molten glass from the body 11 will flow through the tips 13 and bead as shown in FIG. 2. Thus, the bushing 10 will be started as in a conventional bushing, i.e., by manually grasping the falling beads as they string out and then wrapping them about the winding apparatus mandrel to initiate the fiberizing operation.

Once fiberizing operations have commenced, the pressure relationships change. As appreciable flow through the pressure plate occurs, the pressure drop across the pressure plate 14 increases substantially, and the pressure beneath the pressure plate becomes appreciably less than atmospheric pressure. This large pressure drop is schematically indicated by dot-dash line 25. Intermediate the plate 14 and the orifice plate 12, the negative glass pressure will increase by the value of the head pressure of the glass confined between the plates 12, 14 as indicated by the line 26. As the molten glass flows into each tip 13, a pressure drop indicated by line 27 will occur because of the tip itself.

During fiberization, a forming cone 30 is present in each tip 13, only one such cone being shown in FIG. 3 for clarity of illustration. The same cone is illustrated on an enlarged scale in FIG. 4. Each forming cone 30 has an internal pressure at the point 31 which is less than atmospheric pressure, due to the negative pressure above the cone and the attenuation force exerted by the winding apparatus. Each cone 30 is anchored to the interior periphery of the tip 13 by an annular joining portion 32 which contacts the tip interior wall at 33.

The location of the point 31 interiorly of the cone and along the length of the tip is determined by the balance between the surface tension forces acting at the point 33 (i.e., the glass-metal interface surface tension and the glass-air interface surface tension), by the internal cone pressure generated by attenuation of the fiber, and by the negative glass pressure over the orifice plate 12 caused by the pressure drop across the pressure plate 14. The location of the point 33 is determined by these same factors plus the normal glass-to-metal contact angle 29 of 40°. The greater atmospheric pressure exerted at the glass-air interface internally of the tip will cause the joining portion 32 to become upwardly concave.

Figure 5:
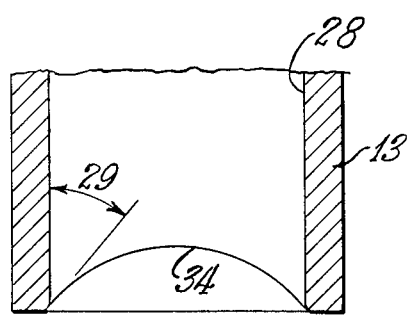
FIG. 5 is similar to FIG. 4, illustrating the orifice when fiber attenuation is interrupted.

Upon attenuation interruption at any given tip, the cone 30 is no longer formed, but the surface tension forces and the negative glass pressure acting on the molten glass in the tip will retain the molten glass in the tip at less than atmospheric pressure. The external atmospheric pressure exerted on the lower surface of the molten glass filling the tip will cause the lower glass surface to bow upwardly in a concave meniscus 34, and the surface tension forces will retain the molten glass in the tip, as shown in FIG. 5.

This condition will be maintained so long as an appreciable flow of glass through the pressure plate 14 occurs, because of the continued attenuation of fiber at the other, non-interrupted fibers. However, when a sufficient number of fibers are broken out at the individual orifices that the flow of glass through the pressure plate is so reduced that the pressure drop across the plate is materially reduced, the pressure beneath the pressure plate increases to greater than atmospheric pressure. At this time, the molten glass flows as a continuous stream at the total head pressure—just as in the start-up condition shown in FIG. 2.

As explained above, the glass-metal contact angle 29 of about 40° will be retained no matter where the cone is located along the length of the tip interior 28. Also, the location of the cone along the tip interior is determined by the balance of three factors, i.e.:

(a) the surface tension forces acting at the intersection of the molten glass with the atmosphere and with the metallic tip wall 28;
(b) the negative internal cone pressure due to attenuation forces; and
(c) the negative glass pressure above the orifice plate.

Figure 6:
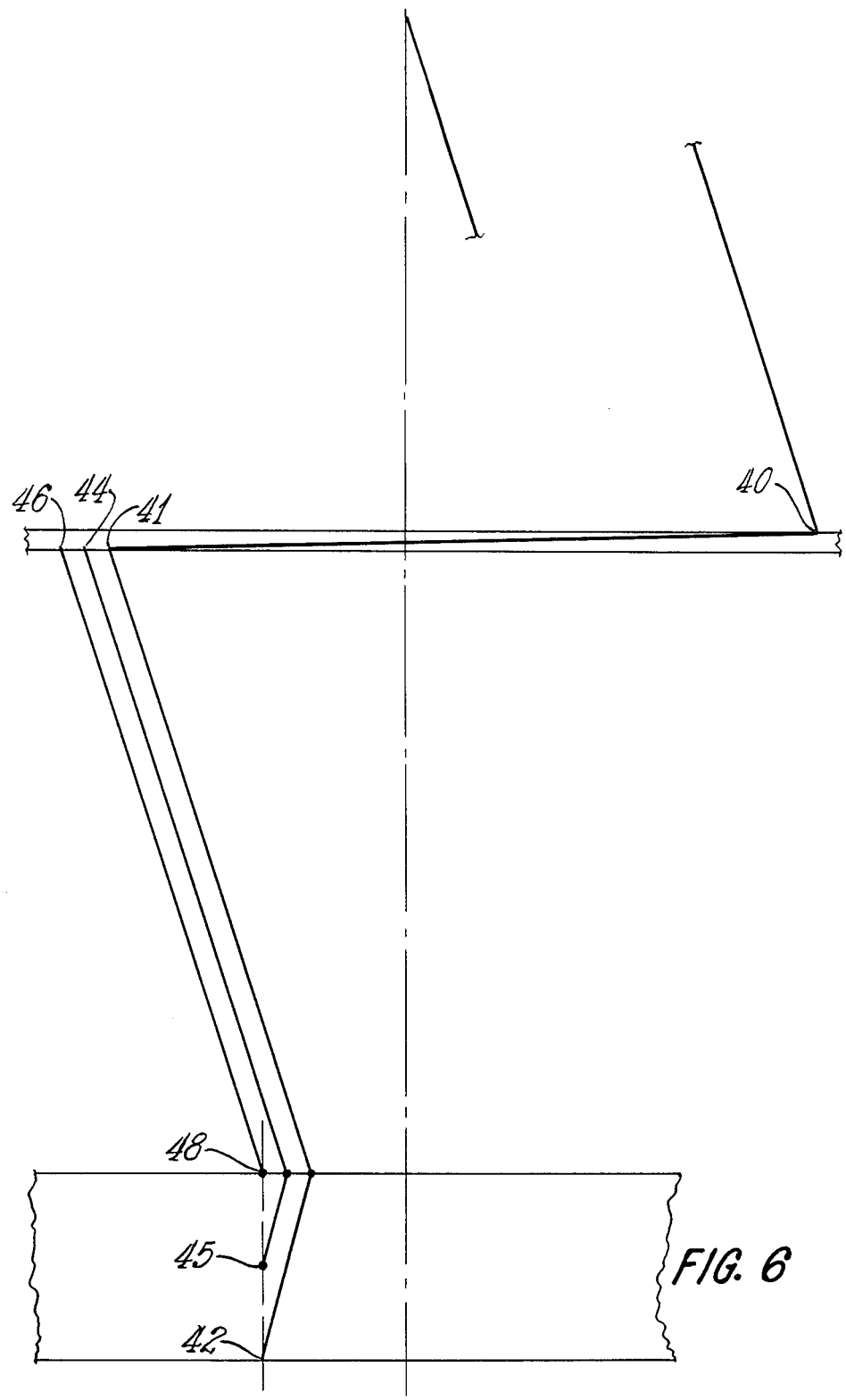
FIG. 6 is a schematic representation similar to FIG. 2, illustrating pressure relationships within the bushing.

FIG. 6 is a visual representation of varying negative glass pressures above the orifice plate. The pressure plate 14 and the orifice plate 12 are schematically represented in FIG. 6. Assuming factors (a) and (b) above to remain constant and varying only factor (c) by varying the size and number of apertures in the plate 14, it can be seen that for the same negative pressure at the point of 33, the location of the cone can be correspondingly varied.

For example, from FIG. 6, a pressure drop across the plate 14 of the magnitude represented by the line 40–41 will result in a desired less-than-atmospheric pressure at the point 42. The point 42 represents the internal cone pressure which corresponds to the internal cone pressure of the cone 43 of FIG. 7; a pressure drop of the magnitude represented by the line 40–44 will result in the same internal pressure at the point 45 of the cone 46 of FIG. 8; and a pressure drop of the magnitude represented by the line 40–46 will result in the same internal pressure at the point 48 of the cone 49 of FIG. 9. From a comparison of FIGS. 7, 8 and 9, it will be seen that the cones 43, 46 and 49 have substantially different configurations and the cones 43, 46 and 49 are located at different levels within the tip 13. Yet each cone 43, 46, and 49 is attached to the interior wall 28 of its tip by a radial portion corresponding to the radial portion 32 previously described at the metal-to-glass angle of 40°, where the glass is "E" glass, the metal is "J" alloy, and the glass is at the temperature appropriate for fiberization.

Figure 7:
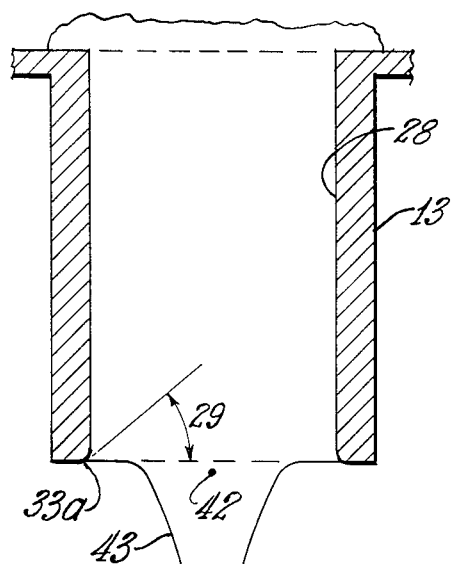
FIG. 7 is a view similar to FIG. 4, illustrating a cone formed at a different location.

In that embodiment of FIG. 7, the pressure drop schematically represented by the line 40–41 is the least pressure drop of the three cases, the point 42 is located furthest down in the orifice plate 12 and the tip 13, and the glass-to-metal contact point 33a is located at the convex radius of the lower end of the inner wall 28. The contact angle 29 is measured from the glass contact with a tangent to the tip radius, and the angle 29 is 40°.

Figure 8:
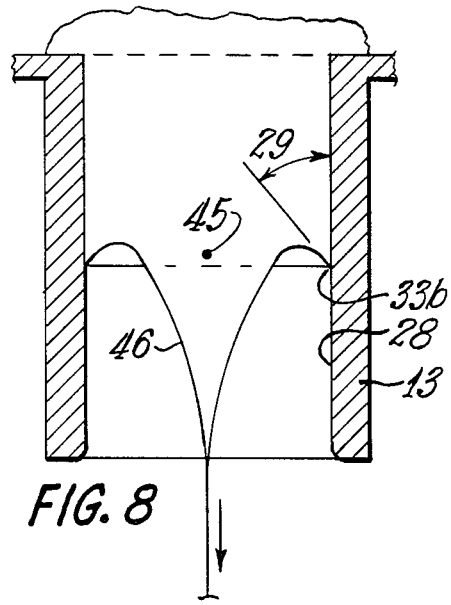
FIG. 8 is a view similar to FIG. 7, illustrating a cone at another position.

In the embodiment of FIG. 8, the pressure drop 40–44 is the intermediate pressure drop of the three cases, the point 45 is located medially of the tip 13, and the contact point 33b is located along the vertical bore 28 of the tip. Once again the contact angle 29 is 40°.

Figure 9:
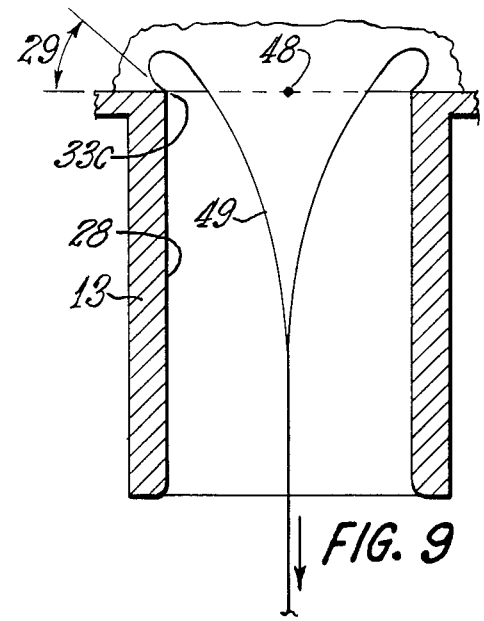
FIG. 9 is a view similar to FIGS. 7 and 8, illustrating the formation of a cone at yet another position.

The embodiment of FIG. 9 is generated by the greatest pressure drop 40–46 of the three cases. The point 48 is located at the upper extremity of the bore 28 of the tip 13, and the contact point 33c is located on the upper surface of the orifice plate 12. Since the glass-to-metal contact angle 29 must be 40° in this embodiment—as well as in the other embodiments—the angle 29 necessarily must be reversed relative to the other embodiments.

It should be emphasized that the cone configurations of FIGS. 3–9 are based on mathematical considerations and other assumptions—coupled with the present state-of-the-art knowledge of the kinetics of fiber attenuation—since it is impossible to directly visually observe the actual cone configurations when they occur within the confines of the tips 13. The direct visual observations are limited to the area beneath the tips, and it is only possible to visually ascertain that (a) the cones appear to be within the confines of the tips in each embodiment of the invention (b) the cones appear to be smaller than the internal diameter of the tips, and (c) cessation of fiber attenuation does not result in the issuance of molten glass from the tips at which attenuation has ceased. It is known that fiber attenuation is possible from molten glass only through the mechanism of cone formation and maintenance of such a cone throughout the fiberization process. Also, it is known that the contact angle of about 40° must be present in fiberization involving "E" glass and "J" alloy. Further, it is known that varying the negative pressure above the orifice plate varies the apparent location of the cone, so far as it can be visually observed.

Consequently, the above explanation of the operation of this invention—including the configuration, size, location, and the formation dynamics of the forming cones—is presented as the best explanation now known to us of the mode of operation. It may well be that this explanation is inaccurate or incomplete—or that the invention operates in an entirely different manner presently unknown to us—but we know of no explanation other than that above presented.

THE PREFERRED EMBODIMENT OF THE INVENTION

A presently preferred embodiment of the present invention is illustrated in FIGS. 10–15 of the drawings.

As best shown in FIG. 10, reference numeral 100 refers to a glass melting furnace containing a body of molten glass, the glass level in the furnace being indicated at 101. Molten glass from the furnace 100 flows beneath a skimmer block 102 into one or more forehearths 103 which are longitudinally elongated, generally rectangular enclosures 104 formed of refractory material and containing a pool of molten glass 105, with the level of glass in the pool 105 being substantially the same as the level of glass 101 maintained by the furnace 100. Positioned along the length of the forehearth 103 are a plurality of bushings indicated generally at 106. One such bushing 106 is illustrated in detail in FIGS. 12–15 and is formed of precious metal alloy, preferably either platinum of "J" alloy which is an alloy of about 75% platinum, 25% rhodium.

In the sectional view of FIG. 11, it will be seen that each of the bushings 106 is positioned beneath the overlying forehearth 103 to receive molten glass therefrom, the molten glass flowing through a vertical aperture 107 in a refractory forehearth bottom block 108 through the registering aperture 109 of the lower bushing block 110, also formed of refractory material. The bushing is positioned against the undersurface of the bushing block 110 and is retained by the forehearth frame structure including an upper L-shaped forehearth frame element 111 carrying fixed depending mounting bolts 112, elongated mounting channels 113 apertured to receive the bolts 112 and secured thereon by suitable means, as by the illustrated nuts 114. The support channels 113 underlie the lower surfaces of shoulders integrally formed in mounting plates 115. The bushing 106 is cast into a refractory mounting block 116. The above-described means for mounting the bushing 106 at the undersurface of the forehearth 103 is conventional, and forms no part of the present invention.

As illustrated in FIGS. 12–15, the bushing includes a pair of lower rectangular orifice plate 120 arranged in side-by-side relation, the two plates 120 being longitudinally co-extensive. Each plate is provided at its inner edge with an upturned flange 121, and the two flanges 121 converge upwardly and are secured to one another to form an integral, longitudinal strengthening rib. The outer longitudinal edges of the plates 120 are welded to upwardly projecting side plates 122, each side plate 122 including a lower vertical portion 123, an inwardly extending medial portion 124, and an upper vertical portion 125. A laterally outwardly extending, perimetric mounting flange 126 of rectangular configuration is welded to the upper edge of the side wall portion 125. The ends of the orifice plates 120 are welded or otherwise secured to a vertical end plate 127 having its upper end underlying and secured to the undersurface of the end portion of the mounting flange 126. The mounting flange has a control opening 128 through which molten glass flows into the bushing.

Positioned above the composite orifice plate comprising the two orifice plate sections 120 is a pressure plate 130. This pressure plate 130 preferably is made in two sections which are welded together along the longitudinal center of the bushing, as at 131. The pressure plate 130 has an upturned marginal flange 132 along all four sides, and the pressure plate 130 is supported at the center, i.e., along the weld line 131 by the upturned flanges 121 of the two orifice plates 120, as best seen in FIG. 16. The pressure plate 130 is supported at spaced relation to the orifice plate sections 120 by the upturned flanges 121, as above described, and also by a plurality of rectangular gussets 133, each gusset having a laterally directed upper flange 134 welded to the undersurface of the pressure plate 130 and contacting the upper surface of the orifice plate 120.

Secured to the end walls 127 are electrical contact ears 135 of relative massive cross-section (FIG. 15), each ear being welded to a mounting yoke 136 of generally trapezoidal shape, and the lateral ends of the yokes are secured to the end walls 127 by a pair of yoke spacers 137. Of course, the purpose of the ears 135 is to electrically heat the bushing, and this heat is distributed in the desired heat pattern to the end walls 127 by the yokes 136 and the yoke spacers 137 interposed between the ears 135 and the end walls 127.

To facilitate mounting of the bushing in position beneath the forehearth, the lower side wall portions 123 of the side walls 122 are provided with mounting flanges 139 which are embedded in the refractory casting 116.

Figure 12:
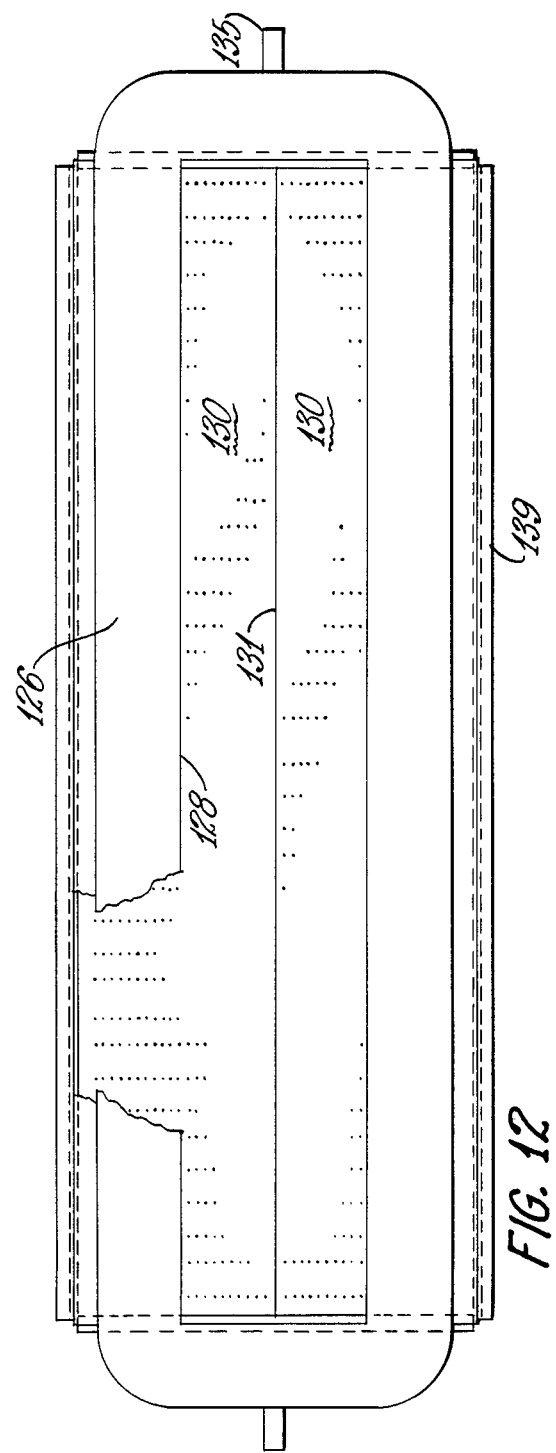
FIG. 12 is an enlarged plan view of the bushing of FIG. 11, with parts broken away and in section.
Figure 13:
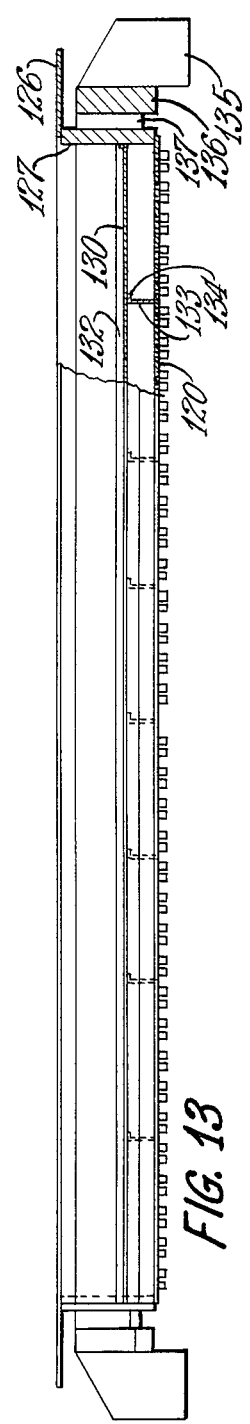
FIG. 13 is a side elevational view of the bushing of FIG. 12 with parts broken away and in section.

As can be ascertained from FIG. 12 of the drawings, the pressure plate 130 is provided with a plurality of apertures. Typically, these apertures are 0.030" in diameter and are on 0.125" spacing, center-to-center. The pressure plate is 0.020" in thickness.

As can be seen from FIG. 14 of the drawings, the orifice plates 120 are provided with a plurality of depending tips 150 which are welded or otherwise secured to the plates to receive molten glass from the interior of the bushing. Preferably, in one preferred embodiment, each tip is relatively large, having an internal diameter on the order of 0.086", with a minimum diameter of 0.070", and such tips are aligned in transverse rows (FIG. 14). The orifice plate is 0.060" in thickness and the tips are each 0.120" in length. The tips are inserted into the plate, so that the total bore length is 0.180" long.

The tips are spaced transversely in their rows, in one embodiment of the invention, on 0.070" centers, the two adjacent rows are spaced at 0.180", and the spacing between the dual rows is 0.290". In an orifice plate 120 which has a bottom rectangular area which is 17.5" in length and 2.4" in width, there will be 1,008 tips. Thus, a bushing capable of attenuating 2,016 fibers will have a longitudinal dimension, including the ears 135, of about 21" and a transverse extent of a little over 6". The actual orifice plate area is about 100 square inches, and the tip density is about 20 per square inch.

The operation of the bushing illustrated in FIGS. 10–15 is the same as previously described, for example in connection with FIG. 3 of the drawings. The orifice plate sections 120 correspond to 12 of FIG. 3, the tips 150 correspond to the tip 13 of FIG. 3, and the apertured pressure plate 130 corresponds to the pressure plate 14 of FIG. 3.

EXAMPLE I

A conventional bushing (Bushing A) was operated for a period of several days. Bushing A had the following characteristics:

| Number of tips | 2488 |
| Tip hole size | 0.050" |
| Tip length | 0.120" |
| Nominal fiber size (HT) | $29 \times 10^{-5}$ |
| Coolant mechanism | Fin shields |

A bushing of the present invention (Bushing B) as illustrated in FIGS. 10–15 was also operated for a period of several days. Bushing B had the following characteristics:

| Number of tips | 2016 |
| Tip hole size | 0.086" |
| Tip length | 0.120" |
| Nominal fiber size (HT) | $29 \times 10^{-5}$ |
| Coolant mechanism | Fin shields |

The performance of the bushings was compared as follows:

|  | Bushing A | Bushing B |
| --- | --- | --- |
| Number of tips | 2488 | 2016 |
| Throughput | 52 lbs/hr | 45 lbs/hr |
| Breaks/hr. | 1.7 | 0.3 |
| Downtime/break (mins.) | 6.7 | 17.6 |
| Operating efficiency | 81% | 90% |
| Conversion efficiency | 63% | 77% |

EXAMPLE II

Additional production runs were made, in which Bushing B was operated for 15 days at a throughput of 45 lbs/hr, with 0.33 breaks per bushing hour or 0.37 breaks per bushing operating hour. Bushing B operated at a bushing operating efficiency of 86% and a conversion efficiency of 84%, with the downtime per break being reduced to 12 minutes per break.

EXAMPLE III

A Bushing C similar to Bushing B was evaluated in a test for an extended period of time. Bushing B was operated in accordance with this invention. Bushing C had the following characteristics:

| Number of tips | 2250 |
| Tip hole size | 0.108" |
| Tip length | 0.070" |

| | |
|---|---|
| Throughput | 110 lbs/hr |
| Nominal fiber size (HT) | $52 \times 10^{-5}$ |
| Coolant mechanism | Air quench |

EXAMPLE IV

A Bushing D was evaluated in a test for an extended period of time. Bushing D also was operated in accordance with the present invention. Bushing D had a non-tipped orifice plate and was air quenched. Bushing D had the following characteristics:

| | |
|---|---|
| Number of orifices | 1512 |
| Orifice plate thickness | 0.050" |
| Orifice diameter | 0.072" |
| Orifice density | 137 per sq/in. |
| Throughput | 75-100 lbs/hr. |
| Nominal fiber size (HT) | $59-80 \times 10^{-5}$ |

Bushing D ran for nine hours without flooding or other process interruption.

We claim:

1. In a method of making glass fibers, the steps of:
   (1) forming a body of molten glass in a fiber-forming bushing having a plurality of depending tubular tips each communicating with said body;
   (2) regulating the pressure of the molten glass body so that the pool of molten glass immediately above the tips and communicating freely with each tip is at less than atmospheric pressure;
   (3) maintaining in each tip a body of glass at a pressure no greater than atmospheric pressure;
   (4) attenuating a fiber from the glass body in each tip; and
   (5) preventing the issuance of molten glass from any one of said tips should fiberization be interrupted at that tip.

2. A method as defined in claim 1, wherein each fiber is attenuated from its pool through a composite forming cone including a central forming portion and an integral outer encircling portion, said central portion being downwardly convergent to the drawn fiber and having an outer diameter substantially smaller than the internal tip diameter, and said outer portion projecting radially outwardly to engage the inner periphery of the tip.

3. A method of making glass fibers including the steps of:
   (a) forming a pool of molten glass in a bushing over an orifice plate having a plurality of depending tubular tips communicating with the upper surface of said orifice plate, each tip having an internal diameter of at least 0.070 inches, said pool having an intermediate perforate flow-resistant plate immersed therein to overlie said orifice plate;
   (b) flowing molten glass downwardly from said pool through said intermediate plate, and into said tips, the downward flow reducing the pressure of the molten glass above the orifice plate to less than atmospheric pressure in each tip;
   (c) attenuating a fiber cone and a fiber from the pool in each tip, each cone having a diameter appreciably less than 0.070 inches and being stabilized in the associated tip by a peripheral portion extending outwardly from the base of the cone to the periphery of the associated tip; and
   (d) each cone projecting axially of the associated tip beneath the pool therein, with the attenuated fiber extending substantially axially of and downwardly through the associated tip.

4. In a method of making glass fibers, the steps of:
   (1) forming a body of molten glass in a fiber-forming bushing having an orifice plate provided with a plurality of tips communicating with said body;
   (2) regulating the pressure of the molten glass pool so that the glass head pressure at the entrances of each of said tips is less than atmospheric pressure;
   (3) attenuating fibers from forming cones at least partially located internally of said tips, respectively, each forming cone (a) being substantially smaller in diameter than the tip internal diameter and (b) being stabilized in the associated tip by a peripheral portion integral with the cone and extending outwardly therefrom to engage the inner periphery of the tip and
   (4) the less-than-atmospheric glass head pressure at the tip entrance preventing the emission of molten glass from any tip at which fiberization has been interrupted.

5. A method as defined in claim 2, wherein the orifices each have a diameter of at least 0.070 inches.

6. A method of making glass fibers including the steps of:
   (a) forming a primary pool of molten glass in a bushing over an orifice plate having a plurality of dependent tubular tips, each tip having an internal diameter of at least 0.070 inches, and an intermediate perforate flow-resistant plate immersed in said pool and overlying said orifice plate;
   (b) forming a secondary pool of molten glass in each of said tips at a pressure no greater than atmospheric pressure due to the pressure drop across said intermediate plate; and
   (c) attenuating a fiber from the pool in each of said tips from a forming cone located between the orifice plate and the lower end of the associated tip, each forming cone (a) being of less diameter than said tip and (b) being stabilized internally of its tip by a peripheral portion integral with the cone and extending radially outwardly from the base of the cone to the tip interior wall.

7. In a method of making glass fibers, the steps of:
   (a) forming a body of molten glass of appreciable depth in a fiber-forming bushing having an orifice plate provided with a plurality of orifices having a diameter of at least 0.070 inches;
   (b) regulating the pressure of the molten glass pool so that the molten glass in each orifice of the orifice plate is at a pressure no greater than atmospheric pressure; and
   (c) attenuating a fiber from the molten glass in each orifice from a forming cone, each forming cone (a) being of downwardly convergent, generally conical configuration, (b) being at least partially located internally of the orifice and (c) being fixed to the orifice interior wall through an outer annular joining portion.

8. In a method of making glass fibers, the steps of:
   (a) forming a unitary pool of molten glass in a bushing and in a plurality of dependent tubular tips having an internal diameter of at least 0.070 inches, and an intermediate perforate plate immersed in said pool and overlying said tips;
   (b) attenuating fibers in a steady state operation from discrete pools of molten glass located interiorly of said tips above the lower ends of said tips, the appreciable downward flow of molten glass through said intermediate plate reducing the pressure of the molten glass pools in the tips to a pressure no greater than atmospheric pressure; and (c) the attenuation taking place from a forming cone initiated from the molten glass pool within each tip, each forming cone being (a) downwardly convergent to the fiber attenuated therefrom, (b) being smaller than the surrounding tip, and (c) being stabilized internally of its tip by an integral peripheral portion extending from the upper extremity of the forming cone to the inner periphery of the tip.

9. In a method of making glass fibers, the steps of:
(a) flowing molten glass from a pool of molten glass into the flow passages of a tipped bushing, each flow passage including a depending tip having an internal diameter of at least 0.070 inches; and
(b) attenuating a fiber from each of said flow passages in a steady state operation during which the pressure of the molten glass in each flow passage is no greater than atmospheric pressure, fiber attenuation taking place from forming cones located in said glass flow passages and each of a diameter less than 0.070 inches, and each cone being stabilized in its own flow passage by a peripheral portion extending radially outwardly from the base of the cone to the inner periphery of the surrounding glass flow passage.

10. In a method of making glass fibers, the steps of:
(a) forming a body of molten glass of appreciable depth in a fiber-forming bushing having an orifice plate bearing a plurality of depending tubular tips communicating with said body, each tip having an internal diameter of at least 0.070 inches;
(b) regulating the pressure of the molten glass body so that the molten glass entering the tips is at less than atmospheric pressure; and
(c) attenuating a fiber from a forming cone located at the bottom of the pool of molten glass in each tip and where the glass in the tip is at substantially atmospheric pressure, each forming cone being downwardly convergent inside the corresponding tip and being stabilized inside the tip by a peripheral portion extending radially outwardly from the base of the cone to the interior wall of the tip.

11. A method as defined in claim 2, wherein the tips have an internal diameter of at least 0.070 inches, and the outer cone portion contacts the inner periphery of the tip at the upper extremity of the tip.

12. The method as defined in claim 2, wherein the tips have an internal diameter of at least 0.070 inches, and the outer cone portion contacts the inner periphery of the tip at the lower extremity of the tip.

13. A method as defined in claim 2, wherein the tips have an internal diameter of at least 0.070 inches, and the outer cone portion contacts the inner periphery of the tip medially of the tip length.

14. A method as defined in claim 10, wherein said forming cone is stabilized at the upper extremity of the tip.

15. A method as defined in claim 10, wherein said forming cone is stabilized at the lower extremity of the tip.

16. A method as defined in claim 10, wherein the forming cone is stabilized medially of the vertical extent of the tip.

17. In a method of making glass fibers, the steps of:
(a) forming a pool of molten glass in a bushing over an orifice plate having a plurality of orifices therein, each orifice communicating with a depending tubular flood guide, and an intermediate perforate plate immersed in said pool and overlying said orifice plate;
(b) initially flowing molten glass through said intermediate plate and said orifice plate at a head pressure sufficient to extrude a globular bead at the lower outlet end of each flood guide;
(c) downwardly pulling said globular beads exteriorly of said flood guides to initially attenuate fibers;
(d) drawing fibers in a steady state operation with appreciable downward flow of molten glass through said intermediate plate reducing the pressure of the molten glass above the orifice plate to a pressure less than atmospheric pressure and to attenuate a fiber at each orifice from a forming cone extending downwardly into the associated flood guide, each forming cone being downwardly convergent to the fiber attenuated therefrom and each cone being stabilized at its orifice by a peripheral portion extending radially outwardly from the base of the cone to the periphery of the orifice, and each attenuated fiber projecting axially through the adjacent tubular flood guide without contacting said flood guide.

18. A method of making glass fibers including the steps of:
(a) forming a pool of molten glass in a bushing over an orifice plate having a plurality of orifices therein, each orifice having a diameter of at least 0.070 inches and each orifice overlying a dependent tip of substantially the same internal diameter as the orifice diameter, said pool having an intermediate perforate flow-resistant plate immersed therein to overlie said orifice plate;
(b) during start-up, initially flowing molten glass through the intermediate plate and said orifice plate at a pressure substantially equal to the total glass head of said molten glass pool to extrude molten glass from each tip;
(c) initially attenuating the glass extruded from each tip to draw a fiber from the overlying orifice of said orifice plate; and
(d) continuously drawing fibers in a steady state operation with appreciable downward flow of molten glass through said intermediate plate reducing the pressure of the molten glass above the orifice plate to less than atmospheric pressure, each tip of said orifice plate surrounding a forming cone of less diameter than said tip with each cone being stabilized in its respective tip by a peripheral portion extending radially outwardly from the base of the cone to contact the inner periphery of the tip at an angle of about 40°.

* * * * *